US012682239B2

(12) United States Patent
Naressi et al.

(10) Patent No.: US 12,682,239 B2
(45) Date of Patent: Jul. 14, 2026

(54) INTELLIGENT DIGITAL CONTENT GENERATION USING FIRST PARTY DATA

(71) Applicant: Accenture Global Solutions Limited, Dublin (IE)

(72) Inventors: Alexandre Naressi, Valbonne (FR); Clement Rinaudo, Beausoleil (FR); Vincent Thevenin, Courbevoie (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 525 days.

(21) Appl. No.: 18/464,280

(22) Filed: Sep. 11, 2023

(65) Prior Publication Data

US 2025/0053804 A1 Feb. 13, 2025

(51) Int. Cl.
G06N 20/10 (2019.01)
G06N 3/0475 (2023.01)
G06N 3/08 (2023.01)

(52) U.S. Cl.
CPC ............. G06N 3/08 (2013.01); G06N 3/0475 (2023.01); G06N 20/10 (2019.01)

(58) Field of Classification Search
CPC ........ G06N 3/08; G06N 3/0475; G06N 20/00; G06N 20/10; G06N 20/20; G06N 3/047; G06N 5/041; H04M 3/52336; H04M 3/5233; A63F 13/533; G06F 16/2433; G06F 40/30; G06F 3/013; G06F 16/35; G06F 8/30; G06F 21/16; G06Q 40/08; G05B 19/0426; G06T 11/60
See application file for complete search history.

(56) References Cited

U.S. PATENT DOCUMENTS

| | | | | |
|---|---|---|---|---|
| 11,516,158 | B1 * | 11/2022 | Luzhnica | G06F 40/30 |
| 12,547,844 | B2 * | 2/2026 | Cha | G06F 40/40 |
| 2018/0075293 | A1 * | 3/2018 | Schinas | G06N 20/20 |
| 2021/0042662 | A1 * | 2/2021 | Pu | G06N 20/00 |
| 2021/0203784 | A1 * | 7/2021 | Konig | H04M 3/5233 |
| 2023/0005070 | A1 * | 1/2023 | Nguyen | G06Q 40/08 |

(Continued)

FOREIGN PATENT DOCUMENTS

| | | | | |
|---|---|---|---|---|
| CA | 3230716 A1 * | 3/2023 | ........... | H04L 51/234 |
| CN | 116820429 A * | 9/2023 | ............... | G06F 8/30 |

(Continued)

*Primary Examiner* — Steven P Sax

(74) *Attorney, Agent, or Firm* — Mannava & Kang, P.C.

(57) ABSTRACT

Aspects of the present disclosure provide systems, methods, and computer-readable storage media that support intelligent digital content generation using first-party data. For example, a system may extract features from items of first-party data to generate a vector table of vectorized embeddings. A user prompt may be vectorized and input to a machine learning (ML) model to generate a result vector that is a similar to the prompt vector in a latent space representation of the vector database. The system may compare the result vector to the prompt vector, and based on a result of the comparison, output either a sourced digital content item or an unsourced digital content item. The sourced digital content item may be generated by generative ML model(s) based on the result vector, and the unsourced digital content item may be generated by generative ML model(s) based on a custom prompt derived from the prompt vector.

18 Claims, 4 Drawing Sheets

100

(56) References Cited

U.S. PATENT DOCUMENTS

| | | | |
|---|---|---|---|
| 2023/0186201 A1 * | 6/2023 | Cella .................. | G05B 19/0426 |
| | | | 705/7.17 |
| 2024/0215881 A1 * | 7/2024 | Henderson ............. | A61B 5/165 |
| 2024/0362265 A1 * | 10/2024 | He ........................... | G06N 3/08 |
| 2024/0378236 A1 * | 11/2024 | Kharbanda ........... | G06F 16/538 |
| 2024/0378801 A1 * | 11/2024 | Rivas Vetencourt ... | G06F 21/16 |
| 2024/0411751 A1 * | 12/2024 | Radmilac ............ | G06F 16/2433 |
| 2024/0419917 A1 * | 12/2024 | Clement ................ | G06N 3/045 |
| 2024/0420012 A1 * | 12/2024 | Austin ................... | G06N 3/047 |
| 2025/0050221 A1 * | 2/2025 | Chen ..................... | A63F 13/533 |

FOREIGN PATENT DOCUMENTS

| | | | | | |
|---|---|---|---|---|---|
| CN | 116975279 A | * | 10/2023 | ........... | G06F 16/353 |
| CN | 117076668 A | * | 11/2023 | ............ | G06F 16/35 |
| CN | 117078798 A | * | 11/2023 | ............ | G06T 11/60 |
| CN | 120632072 A | * | 9/2025 | ............ | G06N 5/041 |
| WO | WO-2023086926 A1 | * | 5/2023 | ............ | G06F 3/013 |
| WO | WO-2024044011 A1 | * | 2/2024 | ............ | G06F 40/30 |

* cited by examiner

400

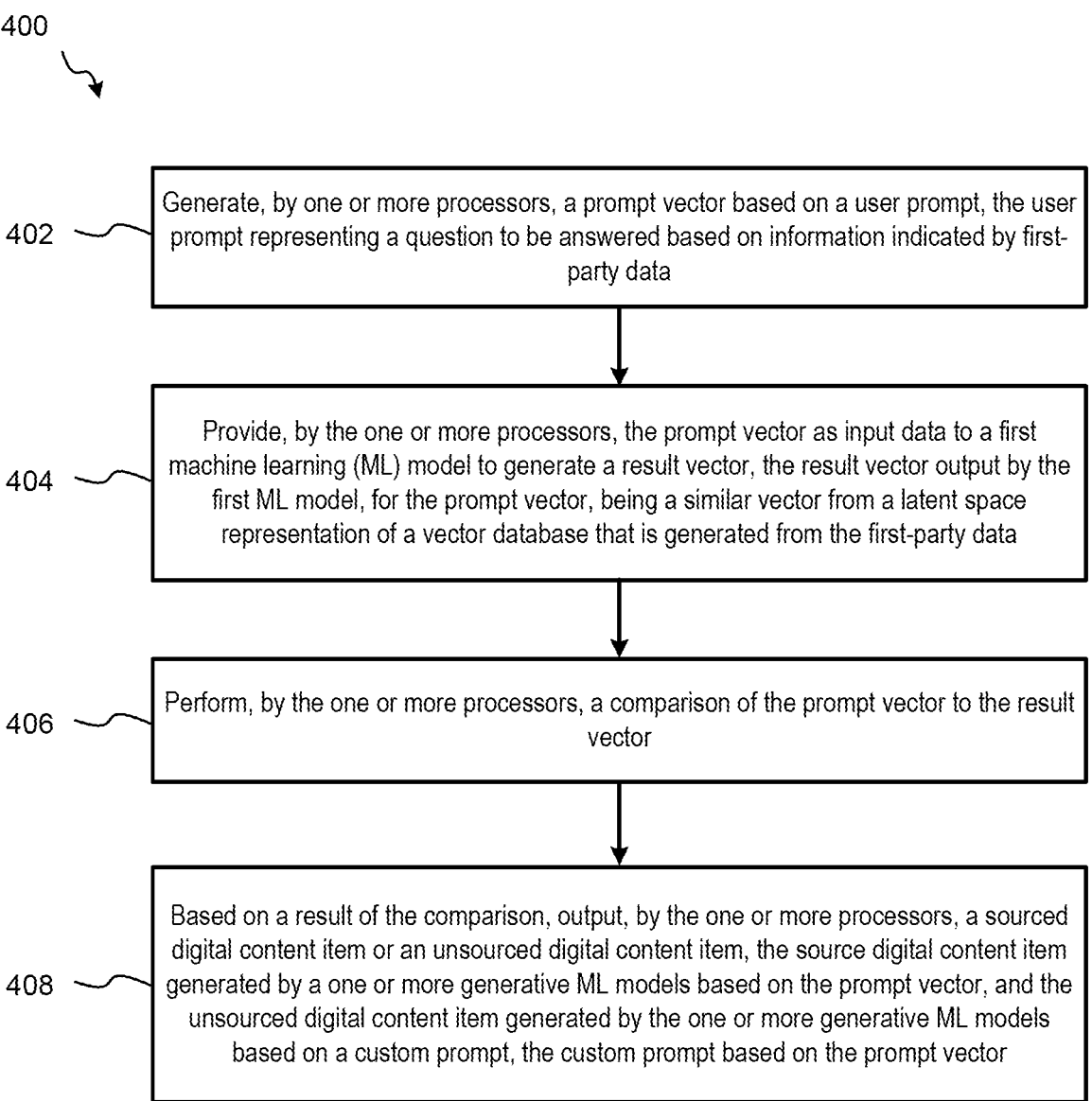

402 — Generate, by one or more processors, a prompt vector based on a user prompt, the user prompt representing a question to be answered based on information indicated by first-party data 404 — Provide, by the one or more processors, the prompt vector as input data to a first machine learning (ML) model to generate a result vector, the result vector output by the first ML model, for the prompt vector, being a similar vector from a latent space representation of a vector database that is generated from the first-party data 406 — Perform, by the one or more processors, a comparison of the prompt vector to the result vector 408 — Based on a result of the comparison, output, by the one or more processors, a sourced digital content item or an unsourced digital content item, the source digital content item generated by a one or more generative ML models based on the prompt vector, and the unsourced digital content item generated by the one or more generative ML models based on a custom prompt, the custom prompt based on the prompt vector

*FIG. 4*

INTELLIGENT DIGITAL CONTENT GENERATION USING FIRST PARTY DATA

CROSS-REFERENCE TO RELATED APPLICATIONS

The present application claims the benefit of priority from European Patent Application No. 23290031.6 filed Aug. 10, 2023 and entitled "INTELLIGENT DIGITAL CONTENT GENERATION USING FIRST-PARTY DATA," the disclosure of which is incorporated by reference herein in its entirety.

TECHNICAL FIELD

The present disclosure relates generally to an intelligent digital content generation using first-party data. Particular implementations leverage vectorized embeddings of the first-party data and machine learning (ML) to identify a digital content item that is similar to a user prompt, and the identified digital content item and the user prompt are used as inputs for intelligent digital content generation using generative ML.

BACKGROUND

As technology advances, research and commercial interest in artificial intelligence and machine learning technologies continues to grow. For example, artificial intelligence is being leveraged to solve challenges in a variety of fields, such as internet searching, document analysis, cybersecurity, image recognition, and many others. One particular area of recent interest in artificial intelligence is generative artificial intelligence ("generative AI"). Unlike other types of artificial intelligence that typically generate a classification or a prediction based on input data, generative AI refers to artificial intelligence models and logic, such as neural networks, that are able to learn patterns from a training data set and generate new and original (e.g., novel) content that is similar to the content of the training data set. For example, generative AI is capable of generating novel text documents, images, and audio given a sufficient training data set and an input prompt or parameters. Although generative AI is useful for generating new content, the content that is generated is still based on the information used to train the generative AI. In some situations, security issues may prevent an entity from training a generative AI model using first-party or proprietary data in order to preserve the privacy of the data. A search engine may be implemented to extract data from the first-party (e.g., private) data, but search engines typically lack capabilities to make the extracted data easily intelligible to a user, which may reduce the utility of the data. Additionally, content that is generated by generative AI that is not trained on the proper data may result in hallucinations or context-unaware content that has limited use to a user. As such, leveraging first-party or other types of private data in an intelligible manner may be challenging to an entity that maintains the data.

SUMMARY

Aspects of the present disclosure provide systems, devices, methods, and computer-readable storage devices and media that support intelligent digital content generation using first-party data. The aspects described herein enable a system to generate digital content items, such as text content that answers a user question, by leveraging both first-party or other private data and generative machine learning (ML)/ artificial intelligence (AI). To illustrate, the system may receive a user prompt and may search first-party data maintained by the system, such as proprietary or private text documents, to identify a digital content item (e.g., a text document) that is most similar to the user prompt. In some aspects, the system may be configured to extract features from digital content items stored as the first-party data as vectorized embeddings to generate a vector database that represents the first-party data, and the system may be configured to similarly extract features from the user prompt to generate a vector prompt. In such aspects, the system may leverage a first ML model to identify a vector in the vector database that is most similar to the vector prompt in a latent space representation of the vectors. The system may compare the identified document to the user prompt to determine whether to use the identified document as a basis for generating a new digital content item. For example, if a distance score (e.g., a difference), such as a cosine distance, between the identified document and the user prompt satisfies a threshold, the identified document may be used as input, or to generate input, for one or more generative ML models to cause generation of a sourced digital content item (e.g., a digital content item that is based on a source within the first-party data). If the distance score fails to satisfy a threshold, the user prompt may be used to generate a custom prompt, such as by applying a prompt template, that is used as input to one or more generative ML models to cause generation of an unsourced digital content item (e.g., a newly-created digital content item that is not based on the first-party data). In this manner, the system outputs either a sourced digital content item or an unsourced digital content item based on the results of the comparison. The digital content item that is output may include text content that answers a question represented by the user prompt may be generated in an intelligent manner. For example, a sourced digital content item may be generated if the results of searching the first-party data are contextually similar enough to the user prompt that it is likely using the user prompt as the basis for input to the generative ML models will not cause hallucinations (e.g., meaningless or incorrect output). However, if the contextual distance is low, and thus the likelihood of hallucination is high, the user prompt may be used as the basis for input to the generative ML models, thereby providing a more intelligible result even if the result is not based on the first-party data. This intelligent selection of input source for the generative ML models enables the system to provide more intelligible and contextually relevant outputs than merely searching for digital content items within the first-party data while preserving the privacy of the first-party data, such as by not using the first-party data to train the generative ML models (which may be trained by another entity).

In a particular aspect, a method for intelligent digital content generation using first-party data includes generating, by one or more processors, a prompt vector based on a user prompt. The user prompt represents a question to be answered based on information indicated by first-party data. The method also includes providing, by the one or more processors, the prompt vector as input data to a first machine learning (ML) model to generate a result vector. The result vector output by the first ML model, for the prompt vector, is a similar vector from a latent space representation of a vector database that is generated from the first-party data. The method includes performing, by the one or more processors, a comparison of the prompt vector to the result vector. The method further includes, based on a result of the comparison, outputting, by the one or more processors, a sourced digital content item or an unsourced digital content item. The sourced digital content item is generated by a one or more generative ML models based on the prompt vector. The unsourced digital content item is generated by the one or more generative ML models based on a custom prompt, the custom prompt based on the prompt vector.

In another particular aspect, a system for intelligent digital content generation using first-party data includes a memory and one or more processors communicatively coupled to the memory. The one or more processors are configured to generate a prompt vector based on a user prompt. The user prompt represents a question to be answered based on information indicated by first-party data. The one or more processors are also configured to provide the prompt vector as input data to a first machine learning (ML) model to generate a result vector. The result vector output by the first ML model, for the prompt vector, is a similar vector from a latent space representation of a vector database that is generated from the first-party data. The one or more processors are configured to perform a comparison of the prompt vector to the result vector. The one or more processors are further configured to, based on a result of the comparison, output a sourced digital content item or an unsourced digital content item. The sourced digital content item is generated by a one or more generative ML models based on the prompt vector. The unsourced digital content item is generated by the one or more generative ML models based on a custom prompt, the custom prompt based on the prompt vector.

In another particular aspect, a non-transitory computer-readable storage device stores instructions that, when executed by one or more processors, cause the one or more processors to perform operations for intelligent digital content generation using first-party data. The operations include generating a prompt vector based on a user prompt. The user prompt represents a question to be answered based on information indicated by first-party data. The operations also include providing the prompt vector as input data to a first machine learning (ML) model to generate a result vector. The result vector output by the first ML model, for the prompt vector, is a similar vector from a latent space representation of a vector database that is generated from the first-party data. The operations include performing a comparison of the prompt vector to the result vector. The operations further include, based on a result of the comparison, outputting a sourced digital content item or an unsourced digital content item. The sourced digital content item is generated by a one or more generative ML models based on the prompt vector. The unsourced digital content item is generated by the one or more generative ML models based on a custom prompt, the custom prompt based on the prompt vector.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 4 is a flow diagram illustrating an example of a method for supporting intelligent digital content generation using first-party data according to one or more aspects.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Figure 1:
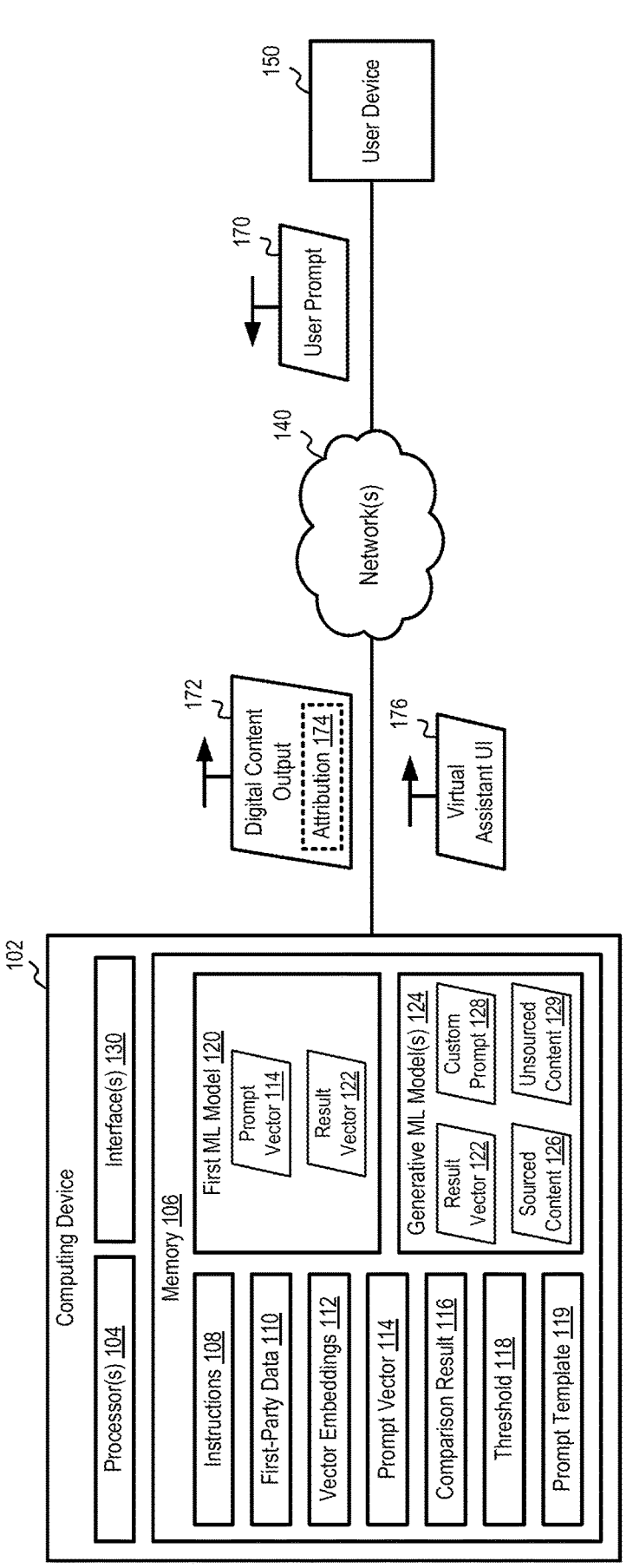
FIG. 1 is a block diagram of an example of a system that supports intelligent digital content generation using first-party data according to one or more aspects.

Referring to FIG. 1, an example of a system that supports intelligent digital content generation using first-party data according to one or more aspects of the present disclosure is shown as a system 100. The system 100 may be configured to generate digital content items derived from first-party data or customized prompts based on a user prompt, thereby combining both searching and generation functionality. As shown in FIG. 1, the system 100 includes a computing device 102, a user device 150, and one or more networks 140. In some implementations, the system 100 may include more or fewer components than are shown in FIG. 1, such as additional client devices, or the like, or the user device 150 may be omitted (and the corresponding operations performed by the computing device 102), as non-limiting examples.

The computing device 102 may be configured to perform one or more operations herein to support intelligent digital content generation. For example, the computing device 102 may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. In the implementation shown in FIG. 1, the computing device 102 includes one or more processors 104, a memory 106, and one or more communication interfaces 130.

It is noted that functionalities described with reference to the computing device 102 are provided for purposes of illustration, rather than by way of limitation and that the exemplary functionalities described herein may be provided via other types of computing resource deployments. For example, in some implementations, computing resources and functionality described in connection with the computing device 102 may be provided in a distributed system using multiple servers or other computing devices, or in a cloud-based system using computing resources and functionality provided by a cloud-based environment that is accessible over a network, such as the one of the one or more networks 140. To illustrate, one or more operations described herein with reference to the computing device 102 may be performed by one or more servers or a cloud-based system that communicates with one or more client or user devices, such as the user device 150.

The one or more processors 104 may include one or more microcontrollers, application specific integrated circuits (ASICs), field programmable gate arrays (FPGAs), central processing units (CPUs) and/or graphics processing units (GPUs) having one or more processing cores, or other circuitry and logic configured to facilitate the operations of the computing device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the computing device 102 may be stored in the memory 106 as instructions 108 that, when executed by the one or more processors 104, cause the one or more processors 104 to perform the operations described herein with respect to the computing device 102, as described in more detail below. Additionally, the memory 106 may be configured to store first-party data 110, vector embeddings 112, a prompt vector 114, a comparison result 116, a threshold 118, a prompt template 119, a first set of one or more machine learning (ML) models (referred to herein as a "first ML model 120"), and one or more generative ML models (referred to herein as "generative ML models 124"). The first ML model 120 may include or be implemented as one or more neural networks (NNs) or one or more support vector machines (SVMs), the generative ML models 124 may include or be implemented as one or more NNs or one or more SVMs. In some other implementations, the first ML model 120 or the generative ML models 124 may include or be implemented as other types of ML or artificial intelligence (AI) models or logic, as further described herein. Illustrative aspects of the first-party data 110, the vector embeddings 112, the prompt vector 114, the comparison result 116, the threshold 118, the prompt template 119, the first ML model 120, and the generative ML models 124 are described in more detail below. Although shown as being stored in memory 106, in some other implementations, the system 100 may include one or more databases integrated in or communicatively coupled to the computing device 102 (e.g., communicatively coupled to the one or more processors 104) that are configured to store any of the first-party data 110, the vector embeddings 112 (or a vector database generated therefrom), the prompt vector 114, the comparison result 116, the threshold 118, the prompt template 119, one or more parameters corresponding to the first ML model 120, one or more parameters corresponding to the generative ML models 124, or a combination thereof.

The one or more communication interfaces 130 may be configured to communicatively couple the computing device 102 to the one or more networks 140 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the computing device 102 includes one or more input/output (I/O) devices (not shown in FIG. 1) that include one or more display devices, a keyboard, a stylus, one or more touchscreens, a mouse, a trackpad, a microphone, a camera, one or more speakers, haptic feedback devices, or other types of devices that enable a user to receive information from or provide information to the computing device 102. In some implementations, the computing device 102 is coupled to a display device, such as a monitor, a display (e.g., a liquid crystal display (LCD) or the like), a touch screen, a projector, a VR display, an AR display, an XR display, or the like. In some other implementations, the display device is included in or integrated in the computing device 102. Alternatively, the computing device 102 may be configured to provide information to support display at one or more other devices, such as the user device 150, as a non-limiting example.

As briefly described above, the computing device 102 may be communicatively coupled to one or more other devices or systems via the one or more networks 140, such as the user device 150. The user device 150 is configured to communicate with the computing device 102 via the one or more networks 140 to enable user interaction with the services provided by the computing device 102. For example, the user device 150 may display information related to providing prompts for digital content generation, displaying generated digital content items, or a combination thereof. The user device 150 may include or correspond to a computing device, such as a desktop computing device, a server, a laptop computing device, a personal computing device, a tablet computing device, a mobile device (e.g., a smart phone, a tablet, a PDA, a wearable device, and the like), a VR device, an AR device, an XR device, a vehicle (or component(s) thereof), an entertainment system, another computing device, or a combination thereof, as non-limiting examples. The user device 150 may include one or more processors, a memory, and one or more communication interfaces, similar to the computing device 102. Although depicted as including a single user device 150, the system 100 is not so limited. For example, the system 100 may include a plurality of user devices 150 that enable multiple users to interact with the services provided by the computing device 102.

During operation of the system 100, the computing device 102 may provide intelligent digital content generation services using the first-party data 110, the first ML model 120, and the generative ML models 124. As part of the intelligent digital content generation service, the computing device 102 may communicate with the user device 150 to enable a user of the user device 150 to ask a question to be answered based on information indicated or represented by the first-party data 110 if such an answer is sufficiently contextually relevant. To illustrate, the user device 150 may receive user input from the user that indicates a question, or other prompt for content generation, and the user device 150 may generate the user prompt 170 based on the user input. For example, the user prompt 170 may represent a question asked by the user but in a format that is used by the computing device 102. The user device 150 may transmit the user prompt 170 to the computing device 102, and upon receipt of the user prompt 170, the computing device 102 may generate the prompt vector 114 based on the user prompt 170.

To support searching of the first-party data 110 based on the user prompt 170, the computing device 102 may be configured to extract features from the first-party data 110 and use the extracted features to form the vector embeddings 112 that can be used to create a vector database that represents the first-party data 110. For example, for each of one or more digital content items of the first-party data 110, the computing device 102 may extract one or more respective features to generate the vector embeddings 112. The types of features extracted by the computing device 102 may be based on the type of content stored as the first-party data 110. For example, the first-party data 110 may represent a plurality of digital content items, in a particular example text documents, and the vector embeddings 112 may be formed by extracting one or more text features that correspond to embeddings of the text documents. In other implementations, the first-party data 110 may include different types of digital content items, such as images, audio, video, multimedia, or the like, and the features may include image features that represent embeddings of the images, as a non-limiting example. Each digital content item (e.g., each document) of the first-party data 110 may have respective extracted features used to create a respective one of the vector embeddings 112. Alternatively, the first-party data 110 may be curated or otherwise processed or organized, such that features are extracted from a subset of the digital content items of the first-party data 110 to generate the vector embeddings 112. The vector embeddings 112 may be organized and stored as a vector database that represents the first-party data 110. A similar process may be performed on the user prompt 170 to generate the prompt vector 114 to be used by the computing device 102 in searching the vector database. For example, one or more of features may be extracted from the user prompt 170 as an embedding of the user prompt 170 that is vectorized to generate the prompt vector 114. The computing device 102 may be configured to extract the same types of features from the user prompt 170 as from the first-party data 110, such that a meaningful comparison may be made between two vectors, as further described herein.

After generating the prompt vector 114, the computing device 102 (e.g., the one or more processors 104) may provide the prompt vector 114 as input data to the first ML model 120 to generate a result vector 122. The first ML model 120 may be configured to output, for an input vector, a similar (e.g., closest or best fit) vector from a latent space representation of the vector database that represents the first-party data 110. The first ML model 120 may include a single ML model (or logic) or multiple ML models (or logic) that are configured such that the multiple ML models perform the actions described herein. The first ML model 120 may be implemented by one or more trained ML or AI models or logic, which may include or correspond to one or more neural networks (NNs), such as multi-layer perceptron (MLP) networks, convolutional neural networks (CNNs), recurrent neural networks (RNNs), deep neural networks (DNNs), deep learning neural networks (DL networks), long short-term memory (LSTM) NNs, or the like. As another example, the first ML model 120 may include or correspond to one or more support vector machines (SVMs) or other kind of trainable and machine-executable ML or AI models or logic. Additionally or alternatively, the first ML model 120 may be implemented as one or more other types of ML models, decision trees, random forests, regression models, Bayesian networks (BNs), dynamic Bayesian networks (DBNs), naive Bayes (NB) models, Gaussian processes, hidden Markov models (HMMs), regression models, or the like. The first ML model 120 may be trained using at least a portion of the vector embeddings 112 to learn a latent space representation of the vector database and to, for an input vector, output a vector of the vector embeddings 112 that is a best fit (e.g., is closest in the latent space representation) for the input vector. In the example illustrated in FIG. 1, when the prompt vector 114 is provided as input to the first ML model 120, the first ML model 120 outputs the result vector 122, which is one of the vector embeddings 112. In some other implementations, the first ML model 120 may be configured to output, or otherwise identify, a particular number of most similar (e.g., closest fit) vectors from the vector database or to output all of the vectors that are within a particular distance within the latent space representation.

After identifying the result vector 122, the computing device 102 may perform a comparison of the prompt vector 114 to the result vector 122. For example, the computing device 102 (e.g., the one or more processors 104) may calculate a distance score (e.g., the comparison result 116) based on the prompt vector 114 and the result vector 122. The comparison result 116 may represent a distance (e.g., a difference) between the two vectors. In some particular implementations, the comparison result 116 is a cosine distance value. For example, the computing device 102 may perform one or more calculations based on the prompt vector 114 and the result vector 122 to determine a cosine distance value that represents the distance (or difference) between the two vectors as the comparison result 116. In other implementations, other types of distance or difference scores may be determined as the comparison result 116. After determining the comparison results 116, the comparison performed by the computing device 102 may include comparing the comparison results 116 (e.g., the distance score) to the threshold 118 to determine whether the comparison results 116 satisfies the threshold 118. For example, if the cosine distance value (e.g., the comparison results 116) is less than or equal to the threshold 118, the comparison may be determined to satisfy the threshold 118. As a non-limiting example, the threshold 118 may be 0.2, and cosine distance values that are less than or equal to 0.2 may satisfy the threshold 118. Alternatively, if the cosine distance value (e.g., the comparison results 116) are greater than the threshold 118, the comparison may be determined to fail to satisfy the threshold 118. Although the threshold 118 is described as being satisfied by values that are less than or equal the threshold 118, in other implementations, the threshold 118 may be satisfied by values that are less than the threshold 118, values that are greater than the threshold 118, or values that are greater than or equal to the threshold 118, depending on the particular distance score being determined.

After performing the comparison between the prompt vector 114 and the result vector 122, the computing device 102 may generate, based on a result of the comparison, a sourced digital content item 126 or an unsourced digital content item 129. Generation of either the sourced digital content item 126 or the unsourced digital content item 129 may be performed by providing a selected input (e.g., based on the result of the comparison) to the generative ML models 124 to cause generation of a digital content item that is either based on the first-party data 110 (e.g., the sourced digital content item 126) or the user prompt 170 and the training of the generative ML models 124 (e.g., the unsourced digital content item 129). The generative ML models 124 may include a single generative ML model or multiple generative ML models configured to generate novel digital content items. Although illustrated in FIG. 1 as being stored in the memory 106, in some other implementations, the generative ML models 124 may be maintained and executed by an external device, such as one or more servers, one or more networked devices, one or more cloud storage or processing resources, one or more databases, or the like, that may be owned or maintained by a different entity than the entity associated with the computing device 102.

The generative ML models 124 may be implemented by one or more trained ML or AI models or logic, which may include or correspond to one or more NNs, such as MLP networks, CNNs, RNNs, DNNs, DL networks, LSTM NNs, or the like. As another example, the generative ML models 124 may include or correspond to one or more SVMs or other kind of trainable and machine-executable ML or AI models or logic. Additionally or alternatively, the generative ML models 124 may be implemented as one or more other types of ML models, decision trees, random forests, regression models, BNs, DBNs, NB models, Gaussian processes, HMMs, regression models, or the like. As used herein, a generative ML model is an AI or ML model that is trained to identify patterns from typically large sets of training data and then to generate new and original data or content (e.g., novel digital content items) that is similar to the training data (e.g., that includes the same or similar patterns identified in the training data sets). Generative ML models output novel digital content, as compared to some other types of ML models or AI models that analyze input data and output a result of the analysis, such as a classification of unlabeled input data, without producing novel digital content items. Examples of generative ML models include large language models (LLMs) and ML image generator models. LLMs generate new and original text content in the style of training text content and based on parameters set by a user. ML image generator models are typically trained on large training sets of images that are labeled with various descriptive features and are capable of generating new and original images based on input parameters or prompts. Although examples described herein are primarily in the context of LLMs, aspects of the present disclosure may also be applied to other types of generative ML models, such as ML image generator models, ML audio generator models, ML video generator models, or other types of digital content generation models and searchable first-party digital content items.

In some implementations, the generative ML models 124 are trained based on third-party data that does not include the first-party data 110. For example, the generative ML models 124 may be trained on a global data source that does not include the first-party data 110, such as publicly available data or data generated by crawling the Internet. In some implementations, the generative ML models 124 may be trained or maintained by a third-party, and as such, providing the first-party data 110 may raise security or privacy issues that prevent use of the first-party data 110 as training data. Alternatively, the generative ML models 124 may originally be trained on third-party or publicly available data, such as by a ML service provider, and upon local implementation of the generative ML models 124 at the computing device 102 (or security networked resources of the entity associated with the computing device 102), the generative ML models 124 may be further trained using at least a portion of the first-party data 110 as training data. In some examples described herein, the first-party data 110 includes a plurality of text documents (e.g., digital content items), the generative ML models 124 include or correspond to one or more LLMs, and the sourced digital content item 126 and the unsourced digital content item 129 include or correspond to text content. For example, the generative ML models 124 may be trained to generate novel text outputs as the digital content items. The text outputs may include or be formatted as answers from a human who is asked a question represented by the user prompt 170. In other implementations, the text outputs may include or be formatted as sentences, social media posts, articles, reports, informational items, emails, text messages, transcripts, search results, text for webpages, chat dialogue, other types of text content, or a combination thereof. By using trained LLMs to output text outputs that are based on particular information (e.g., the first-party data 110 or the user prompt 170), the computing device 102 is capable of providing text content as answers to questions represented by user prompts, and these answers are more intelligible, and therefor have more utility, than simply retrieving and providing a closest matching document from the first-party data 110.

To cause generation of an appropriate digital content item, the computing device 102 selects an input to be provided to the generative ML models 124 from the prompt vector 114 and a custom prompt 128 based on a result of the comparison of the prompt vector 114 to the result vector 122. To illustrate, the sourced digital content item 126 may be generated by the generative ML models 124 based on the prompt vector 114, and the unsourced digital content item 129 may be generated by the generative ML models 124 based on the custom prompt 128. The computing device 102 may select which vector to use as input to the generative ML models 124 based on whether the comparison satisfies the threshold 118. For example, if the comparison result 116 satisfies the threshold 118, the computing device 102 may provide the prompt vector 114 as input to the generative ML models 124 to generate the sourced digital content item 126. Alternatively, if the comparison result 116 fails to satisfy the threshold 118, the computing device 102 may provide the custom prompt 128 as input to the generative ML models 124 to generate the unsourced digital content item 129.

In examples in which the comparison result 116 satisfies the threshold 118 (e.g., the result vector 122 identified by the first ML model 120 is sufficiently contextually similar to the user prompt 170 to be meaningful to a user), the computing device 102 may provide input data based on the result vector 122 to the generative ML models 124 to generate the sourced digital content item 126. In some implementations, the generative ML models 124 may be configured to receive embedding vectors as inputs, and in such implementations, the result vector 122 may be directly provided as input to the generative ML models 124 to cause the generative ML models 124 to generate a novel digital content item (e.g., the sourced digital content item 126) based on the result vector 122. For example, the sourced digital content item 126 may be a text output that is formatted more as an answer to a question as would be given by a human, but that includes or is derived from one of the digital content items (e.g., a document, such as an interview, a question and answer (Q and A) transcript, etc.) of the first-party data 110. In some other implementations, if the generative ML models 124 are not capable of receiving embedding vectors as input, the result vector 122 may be reformatted or otherwise used to generate a properly format input (e.g., a prompt) for the generative ML models 124. Because this novel digital content item is at least partially based on the first-party data 110, this output is referred to as a "sourced" digital content item (e.g., the source of the information in the digital content item is the first-party data 110). In some implementations, in addition to generating and outputting the sourced digital content item 126, the computing device 102 may generate and output identification of a digital content item of the first-party data 110 that corresponds to the result vector 122 as a source of the sourced digital content item 126. For example, the identification may include a document identifier (ID), a name of a person associated with the digital content item (e.g., a person being interviewed, an author, a speaker of a particular portion used to generate the sourced digital content item 126, etc.), a file name, a data associated with the digital content item, a link to the digital content item, other information that identifies the digital content item, or the like. The identifier may be provided as attribution 174, as further described below.

In examples in which the comparison result 116 fails to satisfy the threshold 118 (e.g., the result vector 122 identified by the first ML model 120 is not sufficiently contextually similar to the user prompt 170 to be meaningful to a user), the computing device 102 may provide input data based on the prompt vector 114, particularly the custom prompt 128, to the generative ML models 124 to generate the unsourced digital content item 129. The custom prompt 128 may be based on the prompt vector 114, such as by using one or more additional prompts to generate a new prompt or otherwise reformatting the prompt vector 114 from representing a user question to representing a prompt for digital content generation by the generative ML models 124. In some such implementations, generating the custom prompt 128 may include extracting one or more informational elements from the user prompt 170, such as a subject, an object, entities, names, or the like, and combining the extracted informational elements with the prompt template 119 to generate the custom prompt 128. For example, the prompt template 119 may include text that is formatted according to the configuration of the generative ML models 124 with one or more fields left blank, and the extracted informational elements may be processed and inserted into the empty fields of the prompt template 119 to create the custom prompt 128. The computing device 102 may be configured to perform one or more natural language processing (NLP) operations to identify particular words or other features of the prompt vector 114 in order to assign informational elements to the empty fields of the prompt template 119. In some such implementations, the process may be at least partially performed using a trained ML model. After combining the prompt vector 114 and the prompt template 119 to generate the custom prompt 128, the computing device 102 may provide the custom prompt 128 as input to the generative ML models 124 to cause generation of the unsourced digital content item 129. Because this novel digital content item is not based on the first-party data 110, this output is referred to as an "unsourced" digital content item (e.g., the source of the information in the digital content item is not from the first-party data 110). An unsourced digital content item may also be referred to as a hypothetical digital content item (e.g., a hypothetic answer to the question represented by the user prompt 170). In some implementations, in addition to generating and outputting the unsourced digital content item 129, the computing device 102 may generate and output an indication that the unsourced digital content item 129 is an unsourced output with respect to the first-party data 110. For example, the indication may include text that indicates that the unsourced digital content item 129 was generated using an LLM or another type of generative ML model, an identifier of the generative ML model used to generate the unsourced digital content item 129, text indicating that the unsourced digital content item 129 is a hypothetical answer to the user's question, or the like.

In some implementations, the generative ML models 124 include a single generative ML model, or a single set of one or more generative ML models, that is capable of receiving an embedding vector as an input. In such implementations, the sourced digital content item 126 and the unsourced digital content item 129 are generated by the same generative ML model(s) (e.g., the single generative ML model or the single set of generative ML models using the result vector 122 and the custom prompt 128 as inputs). In some other implementations, the generative ML models 124 include multiple generative ML models (or multiple sets of generative ML models), such as a first generative ML model that is configured to receive embedding vectors as inputs and a second generative ML model that is configured to receive text prompts as inputs. In such implementations, the sourced digital content item 126 and the unsourced digital content item 129 are generated by different ML models of the generative ML models 124. For example, the result vector 122 may be provided as input to the first generative ML model (or a first set of one or more generative ML models) to generate the sourced digital content item 126, and the custom prompt 128 may be provided as input to the second generative ML model (or a second set of one or more generative ML models) to generate the unsourced digital content item 129. Alternatively, the generative ML models 124 may include a single generative ML model, or a single set of generative ML models, that is not capable of receiving an embedding vector as an input. In such implementations, an additional custom prompt may be generated based on the result vector 122, and the sourced digital content item 126 and the unsourced digital content item 129 are generated by the same generative ML model(s) (e.g., the single generative ML model or the single set of generative ML models using the custom prompt 128 and the additional custom prompt as inputs).

After generating either the sourced digital content item 126 or the unsourced digital content item 129, the generated digital content item may be output to the user device 150 as a digital content output 172. For example, the computing device 102 may transmit the digital content output 172 to the user device 150 via the one or more networks 140. If the computing device 102 determines that the comparison result 116 satisfies the threshold 118 and generates the sourced digital content item 126, the digital content output 172 includes the sourced digital content item 126. Alternatively, if the computing device 102 determines that the comparison result 116 does not satisfy the threshold 118 and generates the unsourced digital content item 129, the digital content output 172 includes the unsourced digital content item 129. In some implementations, the digital content output 172 may include an attribution 174. The attribution 174 may indicate a source, or lack thereof, related to the digital content output 172. For example, if the digital content output 172 includes the sourced digital content item 126, the attribution 174 may include identification of the digital content item of the first-party data 110 on which the sourced digital content item 126 is based, as described above. Alternatively, if the digital content output 172 includes the unsourced digital content item 129, the attribution 174 may include an indication that the unsourced digital content item 129 is unsourced or a hypothetical response, as described above.

The computing device 102 may transmit the digital content output 172 to the user device 150 for display and/or storage at the user device 150. The user device 150 may display the digital content output 172 to the user as an answer to the question represented by the user prompt 170. Upon viewing the digital content output 172 (e.g., the sourced digital content item 126 or the unsourced digital content item 129), the user may input a new question to be answered, or a new prompt for generation of a new digital content item, or if the digital content output 172 includes the sourced digital content item 126 and the attribution 174, the user may use the attribution 174 to access a digital content item of the first-party data 110 that provides the source for the sourced digital content item 126. In some implementations, the user may provide a rating on the successfulness of the digital content item in answering their question, and the rating may be provided as feedback data to the computing device 102 to further train the first ML model 120, to further train the generative ML models 124, to adjust the threshold 118, or a combination thereof. As a non-limiting example, if the rating indicates that the answer was unsuccessful, the computing device 102 may decrease the threshold 118 so that sourced digital content items are provided only for closer matches between the prompt vector 114 and the result vector 122.

In some implementations, the computing device 102 may provide the digital content output 172 as part of a virtual assistant tool. For example, the computing device 102 may be configured to support a virtual assistant tool, such as a chatbot, an avatar, or the like, to simulate human interactions with the user of the user device 150. To support such a tool, the computing device 102 may provide a virtual assistant user interface (UI) 176 to the user device 150, and the virtual assistant UI 176 may include or be configured to display the digital content output 172. As a non-limiting example, the user device 150 may execute a virtual assistant application that causes display of a chat window or a graphical avatar that appears to a user of the user device 150 to be a person that is being interacted with to ask and answer questions. In such an example, the virtual assistant UI 176 may provide a more intuitive and easy to query interface for the first-party data 110 than a typical search engine or database interface. The virtual assistant tool may be configured to enable the user to input a question (e.g., as the user prompt 170) and to output the digital content output 172 (e.g., the sourced digital content item 126 or the unsourced digital content item 129) as an answer to the question. To illustrate, the first-party data 110 may represent a plurality of human responses regarding one or more topics, the sourced digital content item 126 may represent information from one of the human responses in an answer format, the unsourced digital content item 129 may represent information from a simulated response associated with the one or more topics, and either the sourced digital content item 126 or the unsourced digital content item 129 may be provided by the virtual assistant as though the virtual assistant is answering the question represented by the user prompt 170. In some implementations, the virtual assistant tool may indicate that the virtual assistant is a simulated human. Alternatively, the virtual assistant tool may appear to the user as though they are interacting with a human being.

In some implementations, aspects of the system 100 may be configured to provide a user experience research assistant. To illustrate, the first-party data 110 may include interviews with various customers that purchased a particular product and describe the customers' views on the product, and the digital content output 172 may represent a synthesized answer to a question about a customer view of a particular aspect of the particular product. As a non-limiting example, the particular product may be a smart phone, and a user of the user device 150 may ask what customers think of a touchscreen of the smart phone. In this example, the digital content output 172 represents an answer from a customer, either based on actual interview (e.g., the first-party data 110) or generated based on the training of the generative ML models 124. Because the digital content output 172 is a new digital content item (e.g., a new text output) that extrapolates a response beyond what is directly provided in a particular interview transcript (or portion thereof) on which the digital content item is based, the digital content output 172 may enable the user of the user device 150 to draw additional insight and innovative understanding of user experiences from curated interview transcripts. In some other implementations, aspects of the system 100 may be configured to provide a simulated job interviewer. To illustrate, the first-party data 110 may include interview questions and answers from various recorded job interviews, and the digital content output 172 may represent a synthesized answer to an interview question presented by the user. This may be helpful to a user in comparing the provided answer to their own answer to predict their performance on an upcoming job interview. Alternatively, the user may be an employer preparing to conduct a job interview. In such an example, the user prompt 170 may represent a question regarding an aspect of the job to be interviewed, and the digital content output 172 may represent a synthesized interview question related to the aspect of a job interview. Additional details of illustrative examples of use cases are shown and described further herein, with reference to FIGS. 3A and 3B.

As described above, the system 100 supports intelligent digital content generation using first-party data. For example, the system 100 may generate the digital content output 172 as an answer to a question represented by the user prompt 170, and the digital content output 172 may be selected from either the sourced digital content item 126 or the unsourced digital content item 129 to improve the relevance of the digital content output 172. To illustrate, if the result vector 122 that is output by the first ML model 120, which represents a closest match to a digital content item of the first-party data 110, is not sufficiently similar to the prompt vector 114, it is unlikely to relevant or helpful to the user. In such situations, such as when the comparison result 116 does not satisfy the threshold 118, the generative ML models 124 generate the unsourced digital content item 129 based on the custom prompt 128 derived from the user prompt 170 so that the computing device 102 may provide a digital content item that is likely to be more relevant than one that is based on the first-party data 110. Alternatively, if the comparison result 116 does satisfy the threshold 118, the generative ML models 124 generate the sourced digital content item 126 based on the result vector 122 so that the computing device 102 may provide a digital content item that is based on the first-party data 110 and that is likely to be relevant to the user. In this manner, intelligent generation of digital content items enables the system 100 to provide digital content items that are more relevant and therefore have higher utility than typical generative ML outputs and less likely to include hallucinations or other context-unaware content. Additionally, because the digital content output 172 is a generative ML output, such as an LLM output, the digital content output 172 may be more easily intelligible to a user than if the first-party data 110 were provided as a response to the user prompt 170.

Figure 2:
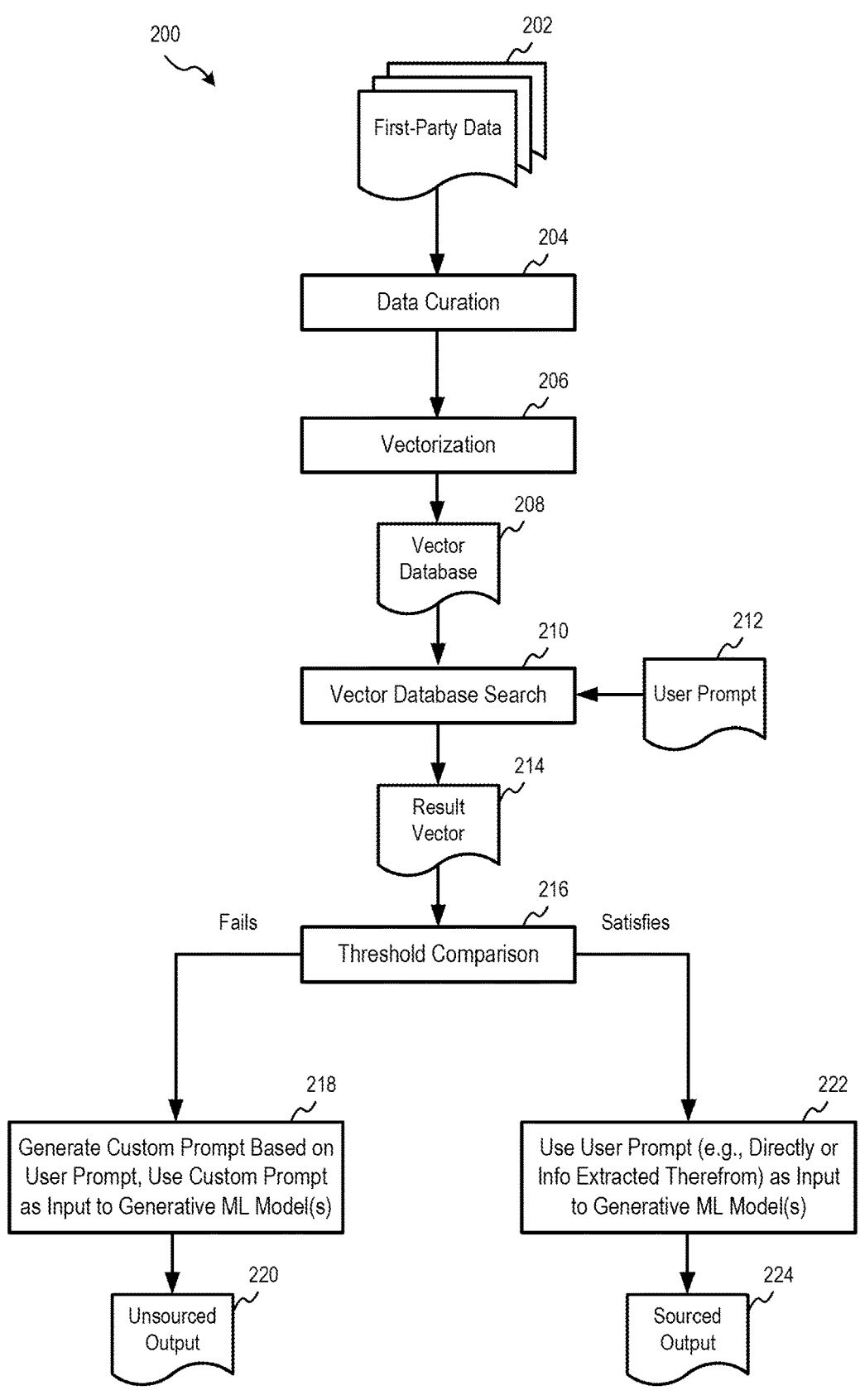
FIG. 2 is a flow diagram illustrating an example process flow for supporting intelligent digital content generation using first-party data according to one or more aspects.

Referring to FIG. 2, an example of a process flow diagram for supporting intelligent digital content generation using first-party data according to one or more aspects is shown as a process flow 200. In some implementations, operations described with reference to the process flow 200 may be performed by one or more components of the system 100 of FIG. 1, such as one or more of the computing device 102 or the user device 150.

The process flow 200 is performed using first-party data 202. The first-party data 202 may include multiple digital content items, such as text documents, images, video content, audio content, multimedia content, or the like, that are private, proprietary, or otherwise not for distribution to outside entities such as an entity that trains generative ML models. The first-party data 202 may include or correspond to the first-party data 110 of FIG. 1. In some implementations, the first-party data 202 may include a plurality of text documents that represent transcriptions of interviews with various people, such as interviews with customers about a product, interviews with job seekers for various jobs, interviews with test users of a prototype, interviews with test audiences, or the like.

The process flow 200 includes data curation, at 204. For example, the first-party data 202 may be curated to remove redundant or incomplete documents from the dataset, as well as to remove documents that exhibit biases or other flaws. The curating may be especially important if the quality of the documents varies from one source to another, as embeddings extracted from the documents will not be better than the documents themselves. The curating may also include subdividing the content of the first-party data 202 into small chunks that can be digested by a trained ML model to perform vector database generation. The process flow 200 includes vectorization, at 206. For example, one or more features may be extracted from the curated documents of the first-party data 202 to generate embeddings that are representative of the respective documents (or chunks). The embeddings may be vectorized to create a plurality of vector embeddings that are used to train a ML model to form a vector database 208 that represents a latent space representation of the vector embeddings. In some implementations, the ML model may include or correspond to the first ML model 120 of FIG. 1. The data curation, vectorization, and generation of the vector database 208 represents a first stage of the process flow 200 that corresponds to embedding of the first-party data 202.

The process flow 200 may include performing a vector database search, at 210. For example, a user prompt 212 may be provided as input to the ML model to search the vector database 208 for a nearest vector in the latent space representation. By submitting the user prompt 212, a user may interrogate the vector database 208 previously created by the trained ML model. The output of ML model is a result vector 214 from the vector database 208 that is the best matching vector to a vectorized version of the user prompt 212 (e.g., a prompt vector, such as the prompt vector 114 of FIG. 1). In some implementations, the result vector 214 includes or corresponds to the result vector 122 of FIG. 1. Although the result vector 214 is the best fit (e.g., closest) vector in the vector database 208 to the vectorized user prompt 212, it nevertheless may be irrelevant relative to the question asked by the user (and represented by the user prompt 212). To illustrate, the lower the cosine distance score, the more "accurate" or contextually relevant an answer based on the result vector 214 will be, as further described below. Searching the vector database 208 and identifying the result vector 214 represents a second stage of the process flow 200 that corresponds to exploiting the vector database 208 as a search engine.

The process flow 200 may include a threshold comparison, at 216. For example, a distance score that indicates the distance between the result vector 214 and the user prompt 212 (or a vector derived therefrom) may be determined, and the distance score may be compared to a threshold as a threshold comparison. In some implementations, the distance score may be a cosine distance value for which a lower value indicates a higher degree of similarity (or a smaller distance) between the two vectors than a larger value. If the distance score fails to satisfy the threshold (e.g., if the cosine distance value is greater than the threshold), the process flow 200 continues to a first output generation operation at 218. However, if the distance score satisfies the threshold (e.g., if the cosine distance value is less than or equal to the threshold), the process flow 200 progresses to a second output generation operation at 222. The threshold comparison of the distance of the result vector 214 and the user prompt 212 represents a third stage of the process flow 200 that corresponds to a relevance check.

If the threshold comparison fails, the process flow 200 includes generating a custom prompt based on the user prompt 212, at 218. For example, one or more informational elements may be extracted from the user prompt 212 (or a vector derived therefrom) and applied to a prompt template to generate the custom prompt. In some implementations, the custom prompt may include or correspond to the custom prompt 128 of FIG. 1. The custom prompt may be provided as input to a generative ML model (or multiple generative ML models) to generate an unsourced output 220 (e.g., a digital content item) based on the custom prompt. For example, the generative ML model may generate a novel text output based on information from the user prompt 212 as the unsourced output 220. Because this digital content item (e.g., text output) is not based on the first-party data 202, it is referred to as unsourced, and in some implementations may be output with an indication that the unsourced output 220 is unsourced or a hypothetical response. This output generation operation may be performed in the situation in which a cosine distance value is greater than the threshold, and therefore an answer based on the first-party data 202 is likely not to be relevant to the user, and thus a call to an LLM with a custom prompt is made to generate an unsourced (e.g., hypothetical) response as the unsourced output 220.

If the threshold comparison is satisfied, the process flow 200 providing, based on the user prompt 212, an input to a generative ML model, at 222. For example, the user prompt 212 may be directly provided as input, or another custom prompt may be generated by extracting informational elements from the user prompt 212 and applying the prompt template to the informational elements to generate the input the generative ML model. Providing such an input to the generative ML model may cause the generative ML model (or multiple generative ML models) to generate a sourced output 224 (e.g., a digital content item) based on the user prompt 212. For example, the generative ML model may generate a novel text output based on information from the result vector 214 (or the document on which the result vector 214 is based) as the sourced output 224. Because this digital content item (e.g., text output) is based on the first-party data 202, it is referred to as sourced, and in some implementations may be output with an indication the document from the first-party data 202 on which it is based. This output generation operation may be performed in the situation in which a cosine distance value is less than or equal to the threshold, and therefore an answer based on the first-party data 202 is likely to be relevant to the user, and using the document as the basis of an input to an LLM generates text content as the sourced output 224 that is more intelligible and has higher utility than merely providing the document (or a portion thereof). As such, the process flow 200 provides a sourced, intelligible output for the question asked by the user.

The output generation operation to either generate the unsourced output 220 or the sourced output 224 represents a fourth stage of the process flow 200 that corresponds to answer generation. In some implementations, a generative ML model may be configured to accept input as both embedding vectors and text prompts. In such implementations, the same generative ML model may be used to generate either the unsourced output 220 or the sourced output 224. In some other implementations, a generative ML model that is configured to accept embedding vectors as inputs may not also be configured to accept text prompts as inputs. In such implementations, different generative ML models may be used to generate the unsourced output 220 and the sourced output 224.

Figures 3A, 3B:
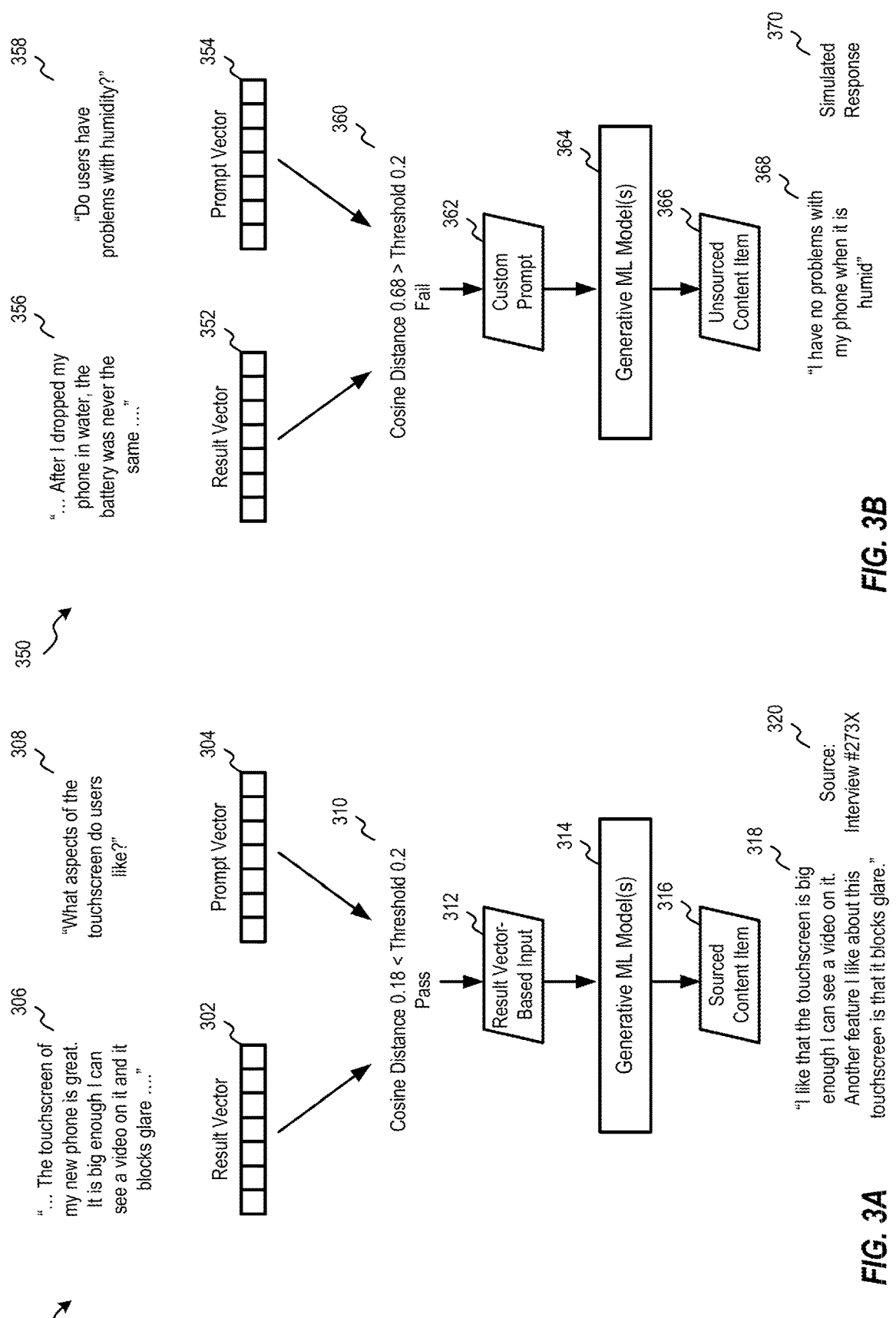
FIG. 3A is an example of intelligent digital content generation using first-party data according to one or more aspects.
FIG. 3B is another example of intelligent digital content generation using first-party data according to one or more aspects.

Referring to FIG. 3A, an example of intelligent digital content generation using first-party data according to one or more aspects is shown as a first example 300. Referring to FIG. 3B, another example of intelligent digital content generation using first-party data according to one or more aspects is shown as a second example 350. The first example 300 illustrated in FIG. 3A is an example of generating a sourced digital content item, and the second example 350 illustrated in FIG. 3B is an example of generating an unsourced digital content item. The examples 300, 350 are described in the context of the first-party data being interviews with customers or users of a smart phone about their experiences for the purpose of providing user experience research assistance. In other implementations, the concepts described with reference to FIGS. 3A and 3B may be applied to other types of first-party or private data and for other purposes, such as interview preparation, providing a virtual assistant, and the like.

In the first example 300 of FIG. 3A, a result vector 302 is output by a trained ML model as a best fit when a prompt vector 304 is provided as input. In this example, the result vector 302 is generated based on a document that includes an interview 306 in which the user states "The touchscreen of my new phone is great. It is big enough I can see a video on it and it blocks glare." In this example, the prompt vector 304 is based on a user prompt 308 that represents the question "What aspects of the touchscreen do users like?" This question may be asked by a user that is doing research on user experiences with the smart phone in order to gain insight to what features should be kept, and what features should be dropped, in a newer model of the smart phone, as a non-limiting example.

A threshold comparison may be performed, at 310. The threshold comparison may include comparing a cosine distance value based on the result vector 302 and the prompt vector 304 to a threshold. In this example, the cosine distance value is determined to be 0.18, which is less than the threshold of 0.2. As such, the threshold comparison is satisfied (e.g., the cosine distance value is less than or equal to the threshold), and a result vector-based input 312 is provided as input to one or more generative ML models 314.

In this example, the interview 306 is determined to be sufficiently contextually similar to the user prompt 308 that an output based on the interview 306 will be relevant (e.g., "accurate") to a user. The result vector-based input 312 may include the result vector 302 or a custom prompt that is generated based on the result vector 302 and a prompt template, or another type of custom prompt based on the result vector 302. Based on receiving the result vector-based input 312, the generative ML models 314 may output a sourced digital content item 316. The sourced digital content item 316 may include a novel text output that is based on the interview 306. The sourced digital content item 316 may be provided to a user device that displays a text output 318 (e.g., based on the sourced digital content item 316) and, optionally, and attribution 320 that indicates the document (e.g., the interview 306) from which the result vector 302 is derived. Because the text output 318 is generated by a LLM, the text output 318 may be more intelligible and useful to the user than the interview 306 (or a portion thereof). In this example, the text output 318 includes the text "I like that the touchscreen is big enough I can see a video on it. Another feature I like about this touchscreen is that it blocks glare" and the attribution 320 includes an interview identifier "Interview #273X" (e.g., a document identifier, a file name, or the like).

In the second example 350 of FIG. 3B, a result vector 352 is output by a trained ML model as a best fit when a prompt vector 354 is provided as input. In this example, the result vector 352 is generated based on a document that includes an interview 356 in which the user states "After I dropped my phone in water, the battery was never the same." In this example, the prompt vector 354 is based on a user prompt 358 that represents the question "Do users have problems with humidity?" This question may be asked by a user that is doing research on user experiences with the smart phone in order to gain insight to what improvements can be made to the smart phone, as a non-limiting example.

A threshold comparison may be performed, at 360. The threshold comparison may include comparing a cosine distance value based on the result vector 352 and the prompt vector 354 to a threshold. In this example, the cosine distance value is determined to be 0.68, which is greater than the threshold of 0.2. As such, the threshold comparison is failed (e.g., the cosine distance value is greater than the threshold), and a custom prompt 362 is provided as input to one or more generative ML models 364. In this example, the interview 356 is determined not to be sufficiently contextually similar to the user prompt 358 such that an output based on the interview 356 will likely not be relevant (e.g., "accurate") to a user. The custom prompt 362 may be generated based on the prompt vector 354 and a prompt template, such as by extracting informational elements from the prompt vector 354 and applying them to the prompt template. Based on receiving the custom prompt 362, the generative ML models 364 may output an unsourced digital content item 366. The unsourced digital content item 366 may include a novel text output that is based on the user prompt 358. The unsourced digital content item 366 may be provided to a user device that displays a text output 368 (e.g., based on the unsourced digital content item 366) and, optionally, and attribution 370 that indicates that the text output 368 is unsourced or a hypothetical/synthesized response. Because the text output 368 is generated by a LLM based on the user prompt 358, the text output 368 may be more relevant and useful to the user than a text output that is generated based on the interview 356 (or a portion thereof). In this example, the text output 368 includes the text "I have no problems with my phone when it is humid" and the attribution 370 indicates that the text output 368 is a "Simulated Response".

Referring to FIG. 4, a flow diagram of an example of a method for supporting intelligent digital content generation using first-party data according to one or more aspects is shown as a method 400. In some implementations, the operations of the method 400 may be stored as instructions that, when executed by one or more processors (e.g., the one or more processors of a computing device or a server), cause the one or more processors to perform the operations of the method 400. In some implementations, these instructions may be stored on a non-transitory computer-readable storage device or a non-transitory computer-readable storage medium. In some implementations, the method 400 may be performed by a computing device, such as the computing device 102 of FIG. 1 (e.g., a device configured for intelligent digital content generation using first-party data), another device, or a combination thereof.

The method 400 includes generating a prompt vector based on a user prompt, at 402. The user prompt represents a question to be answered based on information indicated by first-party data. For example, the prompt vector may include or correspond to the prompt vector 114 of FIG. 1, the user prompt may include or correspond to the user prompt 170, and the first-party data may include or correspond to the first-party data 110 of FIG. 1. The method 400 includes providing the prompt vector as input data to a first ML model to generate a result vector, at 404. For example, the first ML model may include or correspond to the first ML model 120 of FIG. 1. The result vector output by the first ML model, for the prompt vector, is a similar vector from a latent space representation of a vector database that is generated from the first-party data. In some implementations, the first ML model includes or corresponds to one or more neural networks (NNs) or one or more support vector machines (SVMs).

The method 400 includes performing a comparison of the prompt vector to the result vector, at 406. For example, a result of the comparison may include or correspond to the comparison result 116 of FIG. 1. In some implementations, performing the comparison includes determining whether a cosine distance between the prompt vector and the result vector satisfies a threshold. For example, the cosine distance value may include or correspond to the comparison result 116 of FIG. 1, and the threshold may include or correspond to the threshold 118 of FIG. 1. The method 400, based on a result of the comparison, outputting a sourced digital content item or an unsourced digital content item, at 408. For example, the sourced digital content item may include or correspond to the sourced digital content item 126 of FIG. 1, and the unsourced digital content item may include or correspond to the unsourced digital content item 129 of FIG. 1. The sourced digital content item is generated by a one or more generative ML models based on the prompt vector, and the unsourced digital content item is generated by the one or more generative ML models based on a custom prompt, the custom prompt based on the prompt vector. For example, the one or more generative ML models may include or correspond to the generative ML models 124 of FIG. 1, and the custom prompt may include or correspond to the custom prompt 128 of FIG. 1. The one or more generative ML models may be trained based on third-party data that does not include the first-party data, such as being globally trained by a ML service provider or trained by the computing device 102 of FIG. 1 using training data that does not include the first-party data 110. In some implementations, the one or more generative ML models include or correspond to one or more neural networks (NNs) or one or more support vector machines (SVMs). In some implementations, the one or more generative ML models include multiple generative ML models, and the sourced digital content item and the unsourced digital content item are generated by different ML models of the one or more generative ML models. Alternatively, the one or more generative ML models may include a single generative ML model, and the sourced digital content item and the unsourced digital content item may be generated by the single generative ML model.

In some implementations, the method 400 further includes, based on the result of the comparison satisfying a threshold, providing input data based on the result vector to the one or more generative ML models to generate the sourced digital content item. For example, the result vector 122 (or information based thereon) may be provided as input to the generative ML models 124 to generate the sourced digital content item 126 of FIG. 1. In some such implementations, the method 400 may also include outputting identification of a digital content item of the first-party data that corresponds to the result vector as a source of the sourced digital content item. For example, the identification may include or correspond to the attribution 174 of FIG. 1, which may identify one of the digital content items of the first-party data 110 as a source of the sourced digital content item 126.

In some implementations, the method 400 further includes, based on the result of the comparison failing to satisfy a threshold, providing the custom prompt as input data to the one or more generative ML models to generate the unsourced digital content item. For example, the custom prompt may include or correspond to the custom prompt 128 of FIG. 1. In some such implementations, generating the custom prompt includes extracting one or more informational elements from the user prompt and combining the one or more informational elements with a prompt template to generate the custom prompt. Additionally or alternatively, the method 400 may also include outputting an indication that the unsourced digital content item is an unsourced output with respect to the first-party data. For example, the indication may include or correspond to the attribution 174 of FIG. 1, which may indicate that the unsourced digital content item 129 is not based on the first-party data 110 (e.g., that the unsourced digital content item 129 is a hypothetical or synthesized response).

In some implementations, the method 400 further includes, for each of one or more digital content items of the first-party data, extracting one or more respective features to generate one or more vector embeddings and generating the vector database based on a plurality of vector embeddings associated with the first-party data. For example, the one or more vector embeddings may include or correspond to the vector embeddings 112 of FIG. 1 that are used by the first ML model 120 of FIG. 1 to generate a vector database based on a latent space representation of the vector embeddings 112.

In some implementations, the first-party data includes a plurality of text documents, the one or more generative ML models include one or more LLMs, and the sourced digital content item and the unsourced digital content item include text content. Additionally or alternatively, the first-party data may represent a plurality of human responses regarding one or more topics, the sourced digital content item may represent information from one of the plurality of human responses, and the unsourced digital content item may represent information from a simulated response associated with the one or more topics.

In some implementations, the method 400 further includes executing a virtual assistant tool. The virtual assistant tool is configured to simulate human interactions with a user. For example, the virtual assistant tool may include or correspond to the virtual assistant UI 176 of FIG. 1. In some such implementations, the method 400 may also include enabling the user to input a question as the user prompt and outputting the sourced digital content item or the unsourced digital content item as an answer to the question. For example, the novel text content of the digital content output 172 (e.g., the sourced digital content item 126 or the unsourced digital content item 129) may represent an answer to the question represented by the user prompt 170 of FIG. 1.

It is noted that other types of devices and functionality may be provided according to aspects of the present disclosure and discussion of specific devices and functionality herein have been provided for purposes of illustration, rather than by way of limitation. It is noted that the operations of the process flow 200 of FIG. 2 and the method 400 of FIG. 4 may be performed in any order. Additionally or alternatively, one or more operations described with reference to the process flow 200 of FIG. 2 or the method 400 may be performed during performance of another of the method 400 of FIG. 4 or the process flow 200 of FIG. 2. It is also noted that the process flow 200 of FIG. 2 or the method 400 of FIG. 4 may also include other functionality or operations consistent with the description of the operations of the system 100 of FIG. 1, the first example 300 of FIG. 3A, or the second example 350 of FIG. 3B.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-4) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for intelligent digital content generation using first-party data, the method comprising:
   generating, by one or more processors, a prompt vector based on a user prompt input by a user, the user prompt representing a question to be answered based on information indicated by first-party data;
   providing, by the one or more processors, the prompt vector as input data to a first machine learning (ML) model to generate a result vector,
      wherein the result vector output by the first ML model, for the prompt vector, is a similar vector from a latent space representation of a vector database that is generated from the first-party data;
   determining, by the one or more processors, if a distance score between the prompt vector and the result vector satisfies a threshold;
   generating, by the one or more processors, a sourced digital content item or an unsourced digital content item based on the determination, wherein the sourced digital content item is generated by a one or more generative ML models based on the prompt vector if the distance score satisfies the threshold, and wherein the unsourced digital content item is generated by the one or more generative ML models based on a custom prompt if the distance score fails to satisfy the threshold, and wherein the custom prompt is based on the prompt vector and the custom prompt is generated by:

reformatting the prompt vector into the custom prompt for digital content generation by the generative ML models by extracting informational elements from the user prompt, and combining the extracted informational elements with a prompt template that includes text formatted according to a configuration of the one or more generative ML models;

receiving, by the one or more processors from the user, a rating indicating successfulness of the unsourced digital content item in answering the question represented by the user prompt;

providing, by the one or more processors, the rating as feedback data for training the first ML model and the one or more generative ML models to adjust the threshold, wherein, when the rating indicates that the unsourced digital content item was unsuccessful in answering the question, adjusting the threshold such that the sourced digital content item is generated when the distance score indicates a closer match between the prompt vector and the result vector according to the threshold; and enabling, on a user device, a display of the one or more of the generated sourced digital content item and the generated unsourced digital content item to the user.

2. The method of claim 1, wherein determining if the distance score between the prompt vector and the result vector satisfies the threshold comprises determining whether a cosine distance between the prompt vector and the result vector satisfies the threshold.

3. The method of claim 1, further comprising, based on the distance score satisfying the threshold:

providing, by the one or more processors, input data based on the prompt vector and the result vector to the one or more generative ML models to generate the sourced digital content item.

4. The method of claim 3, further comprising:

outputting, by the one or more processors, identification of a digital content item of the first-party data that corresponds to the result vector as a source of the sourced digital content item.

5. The method of claim 1, further comprising:

outputting, by the one or more processors, an indication that the unsourced digital content item is an unsourced output with respect to the first-party data.

6. The method of claim 1, wherein the one or more generative ML models are trained based on third-party data that does not include the first-party data.

7. The method of claim 1, wherein:

the first-party data comprises a plurality of text documents;

the one or more generative ML models comprise one or more large language models (LLMs); and the sourced digital content item and the unsourced digital content item comprise text content.

8. The method of claim 1, further comprising, for each of one or more digital content items of the first-party data:

extracting, by the one or more processors, one or more respective features to generate one or more vector embeddings; and generating, by the one or more processors, the vector database based on a plurality of vector embeddings associated with the first-party data.

9. A system for intelligent digital content generation using first-party data, the system comprising:

a memory; and one or more processors communicatively coupled to the memory, the one or more processors configured to:

generate a prompt vector based on a user prompt input by a user, the user prompt representing a question to be answered based on information indicated by first-party data;

provide the prompt vector as input data to a first machine learning (ML) model to generate a result vector, wherein the result vector output by the first ML model, for the prompt vector, is a similar vector from a latent space representation of a vector database that is generated from the first-party data;

determine if a distance score between the prompt vector and the result vector satisfies a threshold;

generate a sourced digital content item or an unsourced digital content item based on the determination, wherein the sourced digital content item is generated by a one or more generative ML models based on the prompt vector if the distance score satisfies the threshold, and wherein the unsourced digital content item is generated by the one or more generative ML models based on a custom prompt if the distance score fails to satisfy the threshold, and wherein the custom prompt is based on the prompt vector and the custom prompt is generated by:

reformatting the prompt vector into the custom prompt for digital content generation by the generative ML models by extracting informational elements from the user prompt, and combining the extracted informational elements with a prompt template that includes text formatted according to a configuration of the one or more generative ML models;

receive from the user, a rating indicating successfulness of the unsourced digital content item in answering the question represented by the user prompt;

provide the rating as feedback data for training the first ML model and the one or more generative ML models to adjust the threshold, wherein, when the rating indicates that the unsourced digital content item was unsuccessful in answering the question, adjusting the threshold such that the sourced digital content item is generated when the distance score indicates a closer match between the prompt vector and the result vector according to the threshold; and enable on a user device, a display of the one or more of the generated sourced digital content item and the generated unsourced digital content item to the user.

10. The system of claim 9, wherein the one or more generative ML models comprise multiple generative ML models, and wherein the sourced digital content item and the unsourced digital content item are generated by different ML models of the one or more generative ML models.

11. The system of claim 9, wherein the one or more generative ML models comprise a single generative ML model, and wherein the sourced digital content item and the unsourced digital content item are generated by the single generative ML model.

12. The system of claim 9, wherein the first ML model comprises one or more neural networks (NNs) or one or more support vector machines (SVMs).

13. The system of claim 9, wherein the one or more generative ML models comprise one or more neural networks (NNs) or one or more support vector machines (SVMs).

14. The system of claim 9, further comprising:

one or more databases communicatively coupled to the one or more processors, the one or more databases configured to store the first-party data, the vector database, one or more parameters corresponding to the first ML model, one or more parameters corresponding to the one or more generative ML models, or a combination thereof.

15. A non-transitory computer-readable storage device comprising instructions that, when executed by one or more processors, cause the one or more processors to perform operations for intelligent digital content generation using first-party data, the operations comprising:

generating a prompt vector based on a user prompt input by a user, the user prompt representing a question to be answered based on information indicated by first-party data;

providing the prompt vector as input data to a first machine learning (ML) model to generate a result vector, wherein the result vector output by the first ML model, for the prompt vector, is a similar vector from a latent space representation of a vector database that is generated from the first-party data;

determining if a distance score between the prompt vector and the result vector satisfies a threshold;

generating a sourced digital content item or an unsourced digital content item based on the determination, wherein the sourced digital content item is generated by a one or more generative ML models based on the prompt vector if the distance score satisfies the threshold, and wherein the unsourced digital content item is generated by the one or more generative ML models based on a custom prompt if the distance score fails to satisfy the threshold, and wherein the custom prompt is based on the prompt vector and the custom prompt is generated by:

reformatting the prompt vector into the custom prompt for digital content generation by the generative ML models by extracting informational elements from the user prompt, and combining the extracted informational elements with a prompt template that includes text formatted according to a configuration of the one or more generative ML models;

receiving, by the one or more processors from the user, a rating indicating successfulness of the unsourced digital content item in answering the question represented by the user prompt;

providing, by the one or more processors, the rating as feedback data for training the first ML model and the one or more generative ML models to adjust the threshold, wherein, when the rating indicates that the unsourced digital content item was unsuccessful in answering the question, adjusting the threshold such that the sourced digital content item is generated when the distance score indicates a closer match between the prompt vector and the result vector according to the threshold; and enabling, on a user device, a display of the one or more of the generated sourced digital content item and the generated unsourced digital content item to the user.

16. The non-transitory computer-readable storage device of claim 15, wherein:

the first-party data represents a plurality of human responses regarding one or more topics;

the sourced digital content item represents information from one of the plurality of human responses; and the unsourced digital content item represents information from a simulated response associated with the one or more topics.

17. The non-transitory computer-readable storage device of claim 16, wherein the operations further comprise:

executing a virtual assistant tool, the virtual assistant tool configured to simulate human interactions with a user.

18. The non-transitory computer-readable storage device of claim 17, wherein the virtual assistant tool is further configured to:

enable the user to input a question as the user prompt; and output the sourced digital content item or the unsourced digital content item as an answer to the question.

\* \* \* \* \*